United States Patent
Wi et al.

(10) Patent No.: US 11,597,115 B2
(45) Date of Patent: Mar. 7, 2023

(54) APPARATUS AND METHOD FOR CUTTING ELECTRODE SHEET

(71) Applicant: LG CHEM, LTD., Seoul (KR)

(72) Inventors: Yoon Bong Wi, Daejeon (KR); Sin Young Park, Daejeon (KR); Dong Hyeuk Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 197 days.

(21) Appl. No.: 16/629,502

(22) PCT Filed: Nov. 26, 2018

(86) PCT No.: PCT/KR2018/014640
§ 371 (c)(1),
(2) Date: Jan. 8, 2020

(87) PCT Pub. No.: WO2019/212112
PCT Pub. Date: Nov. 7, 2019

(65) Prior Publication Data
US 2020/0139569 A1    May 7, 2020

(30) Foreign Application Priority Data

May 4, 2018 (KR) .......................... 10-2018-0051716

(51) Int. Cl.
*B26D 5/34* (2006.01)
*B26F 1/12* (2006.01)
*H01M 4/04* (2006.01)

(52) U.S. Cl.
CPC ............... *B26D 5/34* (2013.01); *B26F 1/12* (2013.01); *H01M 4/04* (2013.01)

(58) Field of Classification Search
CPC ... B26D 5/00; B26D 5/30; B26D 5/34; B26D 5/26–24; B26F 1/02; B26F 1/12; H01M 4/04
(Continued)

(56) References Cited

U.S. PATENT DOCUMENTS 4,436,008 A * 3/1984 Strunc .................. B26D 5/32
83/210
4,555,968 A * 12/1985 Raney .................. B26D 7/2628
83/365

(Continued)

FOREIGN PATENT DOCUMENTS

CN    203218383 U    9/2013
CN    104907711 A    9/2015
(Continued)

OTHER PUBLICATIONS

Extended European Search Report for European Application No. 18917080.6, dated Jul. 16, 2020.
(Continued)

*Primary Examiner* — Kenneth E Peterson
*Assistant Examiner* — Richard D Crosby, Jr.
(74) *Attorney, Agent, or Firm* — Birch, Stewart, Kolasch & Birch, LLP

(57) ABSTRACT

Discussed is an including a transfer unit transferring an electrode sheet having a plurality of notching grooves formed in a side surface thereof to a cutting point via a measuring point, wherein, when a front notching groove which is disposed at a front end in the electrode sheet is passing through the cutting point, a notching groove disposed in a rear end of the front notching groove is configured to pass through the measuring point; a detection unit at the measuring point to detect the notching groove passing through the measuring point and generating a notching (Continued)

groove detection signal; and a cutting unit at the cutting point to cut the electrode sheet according to the notching groove detection signal generated by the detection unit.

7 Claims, 5 Drawing Sheets

(58) Field of Classification Search
USPC .................................................. 83/370–371
See application file for complete search history.

(56) References Cited

U.S. PATENT DOCUMENTS

| | | | | |
|---|---|---|---|---|
| 4,603,539 | A * | 8/1986 | Mussig | G03D 15/10 53/54 |
| 4,697,485 | A * | 10/1987 | Raney | B65H 20/04 83/365 |
| 4,881,883 | A * | 11/1989 | Michimoto | B01J 37/00 425/89 |
| 5,115,403 | A * | 5/1992 | Yoneda | B23D 59/001 700/173 |
| 6,202,524 | B1 * | 3/2001 | Cunningham | C03B 33/03 451/11 |
| 6,416,559 | B1 * | 7/2002 | Matsumura | H01M 4/32 29/623.1 |
| 6,550,362 | B1 * | 4/2003 | Galinat | B26D 5/32 366/8 |
| 7,967,594 | B2 * | 6/2011 | Tazoe | H01M 4/0435 425/363 |
| 9,095,987 | B2 | 8/2015 | Min et al. | |
| 9,650,223 | B2 * | 5/2017 | Yuhara | H01M 4/139 |
| 9,796,103 | B2 * | 10/2017 | Durst | B26D 7/2628 |
| 9,876,217 | B2 * | 1/2018 | Watanabe | H01M 4/04 |
| 11,005,092 | B2 * | 5/2021 | Yoon | B21D 22/04 |
| 2002/0013998 | A1 * | 2/2002 | Jige | H01M 4/04 29/623.1 |
| 2002/0035903 | A1 * | 3/2002 | Sato | H01G 9/155 83/13 |
| 2004/0013812 | A1 * | 1/2004 | Kollmann | H01M 4/0402 427/437 |
| 2004/0191634 | A1 * | 9/2004 | Yanagawa | H01M 10/0431 429/246 |
| 2005/0214647 | A1 * | 9/2005 | Tanaka | H01M 4/0471 429/233 |
| 2009/0038144 | A1 * | 2/2009 | Teramoto | H01M 4/04 29/623.1 |
| 2009/0100669 | A1 * | 4/2009 | Ikeda | H01M 4/02 29/623.2 |
| 2010/0024203 | A1 * | 2/2010 | Kim | H01M 4/1391 29/623.1 |
| 2011/0131799 | A1 * | 6/2011 | Ito | H01M 10/0409 29/623.1 |
| 2012/0115021 | A1 * | 5/2012 | Yotsumoto | H01M 10/0413 429/178 |
| 2013/0014625 | A1 * | 1/2013 | Yotsumoto | B26F 1/44 83/202 |
| 2013/0019732 | A1 * | 1/2013 | Yotsumoto | H01M 10/0585 83/331 |
| 2013/0244083 | A1 * | 9/2013 | Min | B26D 1/085 429/163 |
| 2013/0252072 | A1 * | 9/2013 | Min | H01M 4/04 429/156 |
| 2013/0277553 | A1 * | 10/2013 | Otani | H01J 37/261 250/307 |
| 2015/0059986 | A1 * | 3/2015 | Komatsu | B26D 3/08 83/872 |
| 2016/0031110 | A1 * | 2/2016 | Middleton | B26D 5/007 83/13 |

FOREIGN PATENT DOCUMENTS

| | | |
|---|---|---|
| EP | 2 648 264 A2 | 10/2013 |
| JP | 9-19963 A | 1/1997 |
| JP | 2014-127273 A | 7/2014 |
| JP | 2016-216186 A | 12/2016 |
| KR | 10-2004-0057304 A | 7/2004 |
| KR | 10-0824808 B1 | 4/2008 |
| KR | 10-2012-0060703 A | 6/2012 |
| KR | 10-2012-0060704 A | 6/2012 |
| KR | 10-2013-0105001 A | 9/2013 |
| KR | 10-2014-0009015 A | 1/2014 |
| KR | 10-1479724 B1 | 1/2015 |
| KR | 10-1509208 B1 | 4/2015 |
| KR | 10-2016-0001353 A | 1/2016 |

OTHER PUBLICATIONS

International Search Report (PCT/ISA/210) issued in PCT/KR2018/014640, dated Feb. 27, 2019.

* cited by examiner

APPARATUS AND METHOD FOR CUTTING ELECTRODE SHEET

CROSS-REFERENCE TO RELATED APPLICATION

The present application claims the benefit of the priority of Korean Patent Application No. 10-2018-0051716, filed on May 4, 2018, which is hereby incorporated by reference in its entirety.

TECHNICAL FIELD

The present invention relates to an apparatus and method for cutting an electrode sheet, and more particularly, to an apparatus and method for cutting an electrode sheet, in which the electrode sheet is cut through detection of a notching groove formed in the electrode sheet to improve cutting accuracy.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

Such a secondary battery is classified into a can type secondary battery in which an electrode assembly is built in a metal can and a pouch type secondary battery in which an electrode assembly is built in a pouch. The pouch type secondary battery comprises an electrode assembly, an electrolyte, and a pouch accommodating the electrode assembly and the electrolyte. Also, the electrode assembly has a structure in which a plurality of electrodes and a plurality of separators are alternately stacked.

The electrode is manufactured by cutting a long sheet-shaped electrode sheet at regular intervals through a cutting apparatus. Here, the cutting apparatus detects an electrode tab formed on the electrode sheet to cut the electrode sheet at regular intervals.

However, in the cutting apparatus, when the electrode tab formed on the electrode sheet is deformed, i.e., folded o lifted, a cutting time of the electrode sheet varies to cause a problem in which the electrode sheet is irregularly cut to manufacture defective electrodes.

DISCLOSURE OF THE INVENTION

Technical Problem

The present invention has been made to solve the above problems, an object of the present invention is to provide an apparatus and method for cutting an electrode sheet, in which the electrode sheet is cut through detection of a notching groove formed in a longitudinal direction of the electrode sheet to constantly maintain a cutting time of the electrode sheet, thereby improving cutting accuracy of the electrode sheet and preventing defective electrodes from being manufactured.

Technical Solution

To achieve the above object, an apparatus for cutting an electrode sheet according to a first embodiment of the present invention comprises: a transfer unit transferring the electrode sheet, in which a plurality of notching grooves are formed in a side surface thereof, up to a cutting point via a measuring point, so that, when the notching groove, which is disposed at a front end, of the notching grooves formed in the electrode sheet passes through the cutting point, the notching groove, which is disposed in a rear end of the front notching groove, passes through the measuring point; a detection unit provided at the measuring point to detect the notching groove of the electrode sheet, which passes through the measuring point, thereby generating a notching groove detection signal; and a cutting unit provided at the cutting point to cut the electrode sheet, in which the notching groove passing through the cutting point is disposed, according to the notching groove detection signal generated by the detection unit.

The detection unit may comprise a line sensor installed in a direction perpendicular to a transfer direction of the electrode sheet to detect the notching groove of the electrode sheet passing through the measuring point and thereby to generate the notching groove detection signal, wherein the line sensor may comprise a plurality of light receiving elements, and the plurality of light receiving elements detects the notching groove through a variation in transmittance, which occurs when the notching groove of the electrode sheet passes through the measuring point.

The notching groove may comprise first and second notching grooves respectively formed in both side surfaces of the electrode sheet to face each other, and the line sensor may comprise first and second line sensors to detect the first and second notching grooves.

The line sensor may generate the notching groove detection signal even though any one of the first and second notching grooves is detected through the first and second line sensors.

When all the first and second notching grooves are detected through the first and second line sensors, the line sensor may generate the notching groove detection signal as a mean value of a time at which the first notching groove is detected and a time at which the second notching groove is detected.

When all the first and second notching grooves are not detected through the first and second notching grooves, the line sensor may generate a notching groove defect signal.

An electrode tab may be provided on one surface of the electrode sheet, in which the first notching groove is formed, and the first line sensor detecting the first notching groove may also detect whether the electrode tab is defective through the variation in transmittance, which occurs when the electrode tab passes.

A method for cutting an electrode sheet according to the first embodiment of the present invention comprises: a step (a) of continuously transferring the electrode sheet, in which a plurality of notching grooves are formed in a side surface thereof, up to a cutting point via a measuring point by using a transfer unit so that, when the notching groove, which is disposed at a front end, of the notching grooves formed in the electrode sheet passes through the cutting point, the notching groove, which is disposed in a rear end of the front notching groove, passes through the measuring point; a step (b) of detecting the notching groove of the electrode sheet passing through the measuring point to generate a notching groove detection signal, and a step (c) of cutting the electrode sheet, in which the notching groove passing through a cutting point is disposed, by using a cutting unit when a notching groove detection signal is generated, to manufacture a unit electrode.

The step (b) may further comprise a step of detecting whether an electrode tab is defective through a variation in transmittance, which occurs when the electrode tab disposed on one surface of the electrode sheet passes, by using a detection unit.

In an apparatus for cutting an electrode sheet according to another embodiment of the present invention, a detection is installed at a measuring point, and the apparatus further comprises an adjusting unit installed to be movable in a direction perpendicular to a transfer direction of an electrode sheet so that the detection unit is adjusted in position to correspond to a notching groove passing through the measuring point.

Advantageous Effects

First: The cutting apparatus of the present invention may comprise the transfer unit, the detection unit, and the cutting unit. The detection unit may detect the notching groove formed in the side surface of the electrode sheet to generate the notching groove detection signal, and the cutting unit may cut the electrode sheet according to the notching groove detection signal generated by the detection unit. Thus, the cutting time of the electrode sheet may be more accurately detected to improve the cutting accuracy of the electrode sheet, thereby preventing the defective electrode from being manufactured.

Second: The detection unit of the present invention may comprise the line sensor detecting the notching groove through the variation in transmittance, which occurs when passing over the notching groove of the electrode sheet, to more accurately detect the notching groove, thereby more accurately detecting the cutting time of the electrode sheet.

Third: The notching groove of the present invention may comprise the first and second notching grooves, which are respectively formed in both the surfaces of the electrode sheet to face each other. The line sensor may comprise the first and second line sensors to detect the first and second notching grooves, thereby improving the sensibility of the notching groove.

Fourth: The line sensor of the present invention may generate the detection signal of the notching groove even though any one of the first and second notching grooves is detected through the first and second line sensors, thereby previously preventing the accident due to the non-detection of the notching groove from occurring.

Fifth: The line sensor of the present invention may generate the detection signal of the notching groove as the mean value of the time, at which the first notching groove is detected, and the time, at which the second notching groove is detected, when all the first and second notching grooves are detected through the first and second line sensors. Thus, the cutting time of the electrode sheet may be uniformly controlled to manufacture the electrodes having the uniform quality.

If the time at which the first notching groove is detected and the time at which the second notching groove is detected are within the set time, the line sensor of the present invention determines this state as normal, and if the times are beyond the set time, the line sensor determine this state as skew fail, and thus, the transferring through the transfer unit may be stopped.

Sixth: When the all the first and second notching grooves are not detected through the first and second line sensors, the line sensor of the present invention may generate the notching groove defect signal to previously prevent the defective electrode sheet from being continuously cut.

Seventh: The line sensor of the present invention may detect the electrode tab provided on one side surface of the electrode sheet through the first line sensor that detects the first notching groove, and the first line sensor may detect whether the electrode tab is defective through the variation in transmittance, which occurs when the electrode tab passes. Thus, whether the electrode sheet is deformed may be easily detected, and also, the quality test of the electrode tab may be performed without a separate additional sensor.

MODE FOR CARRYING OUT THE INVENTION

Figure 1:
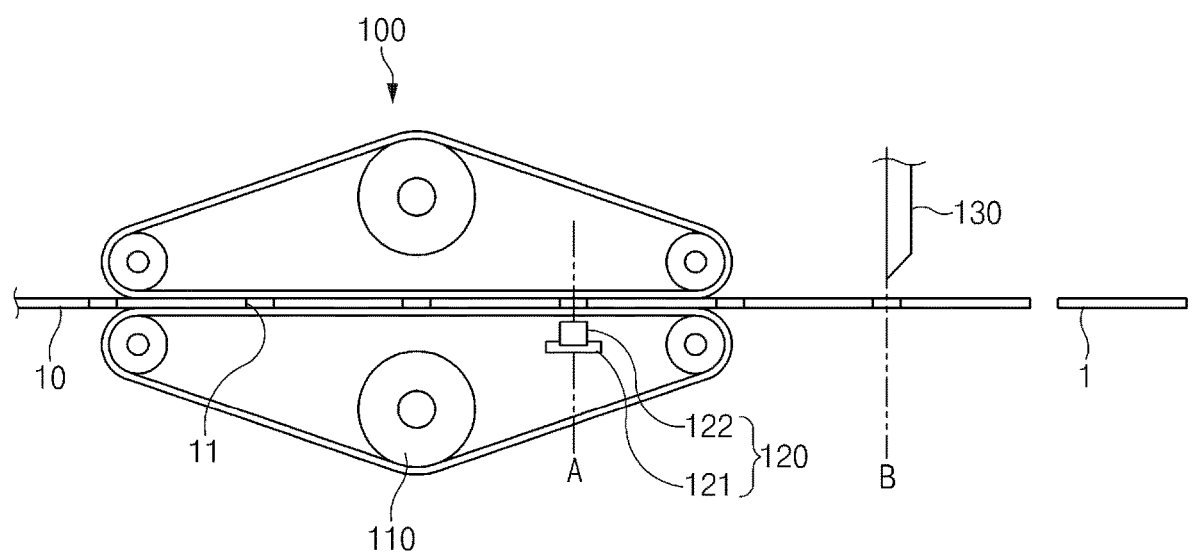
FIG. 1 is a cross-sectional view of an apparatus for cutting an electrode sheet according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Electrode Sheet]

Referring to FIG. 1, an electrode sheet 10 according to a first embodiment of the present invention comprise a long sheet-shaped collector and an electrode active material layer applied to both surfaces of the collector. Also, an electrode tab 12 is formed on one side surface (a right surface when viewed in FIG. 1) of the collector, and a notching groove 11 for identifying a cutting portion of the electrode sheet 10 is formed between the electrode tabs 12. The notching groove 11 comprises a first notching groove 11a and a second notching groove 11b, which are respectively formed in both surfaces of the electrode sheet 10 to face each other.

Also, the first notching groove 11a and the second notching groove 11b are provided in plurality along a longitudinal direction of the electrode sheet 10. Particularly, the plurality of first notching grooves 11a and the plurality of second notching grooves 11b are formed at regular intervals in the longitudinal direction of the electrode sheet 10 and have a triangular shape to accurately indicate a cutting position.

The electrode sheet 10 having the above structure may be cut at a position at which the notching groove 11 is disposed so as to be manufactured as unit electrodes 1. Here, the electrode sheet 10 is cut by using an apparatus for cutting the electrode sheet.

That is, the apparatus for cutting the electrode sheet may cut the electrode sheet 10 through the notching groove 11 formed in the electrode sheet 10 to improve current accuracy, thereby continuously manufacturing the unit electrodes 1 having uniform quality.

Apparatus for Cutting Electrode Sheet According to First Embodiment

For example, as illustrated in FIG. 1, an apparatus 100 for cutting an electrode sheet according to a first embodiment of the present invention is an apparatus for cutting an electrode assembly through detection of a notching groove formed in a side surface of the electrode sheet and comprises a transfer unit 110 transferring an electrode sheet 10 in which a plurality of notching grooves 11 are formed at regular intervals in a side surface thereof, a detection unit 120 detecting the notching grooves 11 formed in the electrode sheet 10 transferred by the transfer unit 110, and a cutting unit 130 cutting the electrode sheet 10 when the detection unit 120 detects the notching grooves 11 to manufacture unit electrodes 1.

Transfer Unit

Referring to FIG. 1, the transfer unit 110 transfers the electrode sheet 10, in which the notching grooves 11 are formed, up to a cutting point B via a measuring point A. Here, the transfer unit 110 transfers the electrode sheet 10 so that when the notching groove (hereinafter, referred to a front notching groove 11B), which is disposed in a front end, of the notching grooves 11 formed in the electrode sheet 10 passes through the cutting point B, the notching groove (hereinafter, referred to as a rear notching groove 11A), which is disposed in a rear end of the front notching groove 1B, passes through the measuring point A.

Here, the transfer unit 110 comprises a conveyor belt transferring the electrode sheet 10 so that the notching grooves 11 formed at the regular intervals in the side surface of the electrode sheet 10 sequentially pass through the measuring point A to be transferred up to the cutting point B. The conveyor belt is provided in a pair to support and transfer both surfaces of the electrode sheet 10 at the same time.

Detection Unit

The detection unit 120 detects the notching groove of the electrode sheet passing through the measuring point A to generate a notching groove detection signal and comprises a detection body 121 provided at the measuring point A and a line sensor 122 fixed to the detection body 121 to detect the notching groove 11 of the electrode sheet 10 passing through the measuring point A and thereby to generate the notching groove detection signal.

Here, the line sensor 122 is installed in a direction perpendicular to the transfer direction of the electrode sheet 10 to detect the notching groove 11 of the electrode sheet 10 passing through the measuring point A and thereby to generate the notching groove detection signal.

In more detail, the line sensor 122 comprises a plurality of light receiving elements 122c. The plurality of light receiving elements 122c detects the notching groove 11 through a variation in transmittance, which occurs when the notching groove 11 of the electrode sheet 10 passes through the measuring point A.

Figure 2:
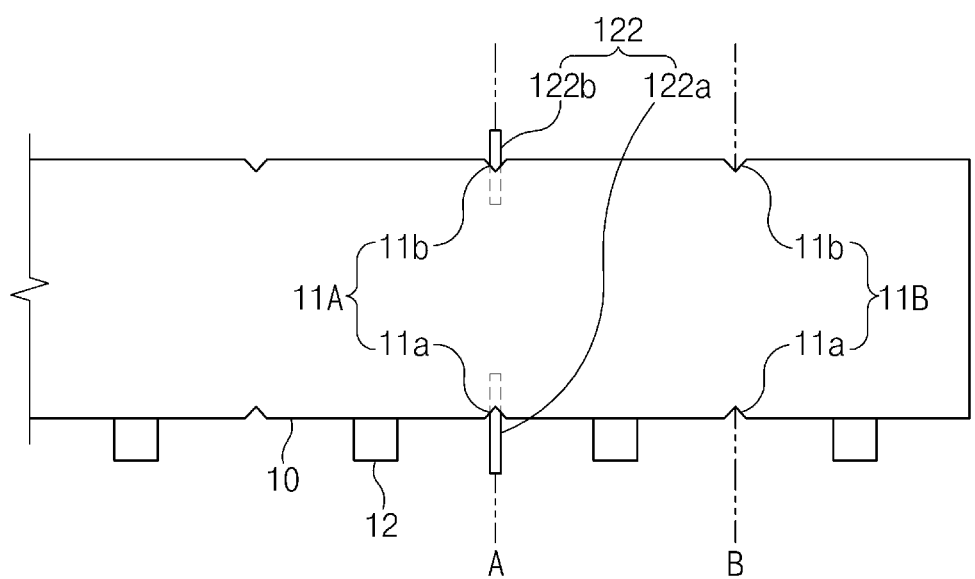
FIG. 2 is a schematic plan view of the apparatus for cutting the electrode sheet according to the first embodiment of the present invention.
Figure 3:
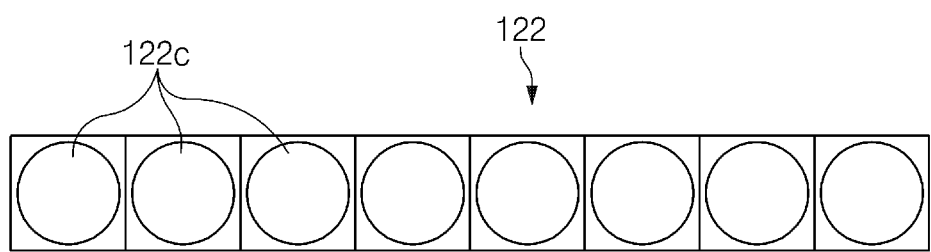
FIG. 3 is a plan view illustrating a line sensor of the apparatus for cutting the electrode sheet according to the first embodiment of the present invention.

That is, referring to FIGS. 2 and 3, in the line sensor 122, the plurality of light receiving elements 122c are installed to be connected to each other in a direction that is perpendicular to the transfer direction of the electrode sheet 10, and the plurality of light receiving elements 122c have a predetermined transmittance while emitting light toward the electrode sheet 10. Here, when the notching groove 11 formed in the electrode sheet 10 passes through the measuring point A, the plurality of light receiving elements irradiated toward the electrode sheet 10 varies in transmittance. Here, the variation in transmittance may be calculated to detect the notching groove 11 of the electrode sheet 10.

Particularly, the line sensor 122 comprises first and second line sensors 112a and 112b detecting the first and second notching grooves 11a and 11b respectively formed in both surfaces of the electrode sheet 10 to face each other. The line sensor 122 comprising the first and second line sensors 112a and 112b may be set as follows.

First: The line sensor 122 may generate the notching groove detection signal even though any one notching groove of the first and second notching grooves 11a and 11b is detected through the first and second line sensors 122a and 122b. That is, the sensor line 122 may generate the notching groove detection signal by being determined as the cutting time even though any one of the first and second notching grooves 11a and 11b is detected through the first and second line sensors 122a and 122b. Thus, although a problem occurs in any one of the first and second line sensors 122a and 122b or any one of the first and second notching grooves 11a and 11b, the notching groove detection signal may be generated to improve continuity of the cutting operation.

Particularly, the line sensor 122 comprises the first and second line sensors 122a and 122b. Thus, when only any one of the first and second notching grooves 11a and 11b is detected, the notching groove detection signal may be generated, and simultaneously, a defective signal may be generated with respect to the notching groove that is not detected. Accordingly, it is possible to be controlled so that a unit sheet having the notching groove, in which the defect signal is generated, is not provided for a method for manufacturing an electrode assembly.

Second: When all the first and second notching grooves 11a and 11b are detected through the first and second line sensors 122a and 122b, the line sensor 122 generates a notching groove detection signal as a mean value of a time at which the first notching groove 11a is detected and a time at which the second notching groove 11b is detected.

Here, when the mean value of the time at which the first notching groove 11a is detected and the time at which the second notching groove 11b is detected is within the set value, the line sensor 122 determines this state as normal to generate the notching groove detection signal. When the mean value of the time at which the first notching groove 11a is detected and the time at which the second notching groove 11b is detected is beyond the set time, the line sensor 122 this state as abnormal to generate the defective signal and simultaneously generate a signal for stopping the transfer part 110 so that the electrode sheet 10 is not transferred.

The set value may be set to a value of 2.0 mm or less, preferably, 1.0 mm or less. That is, when the set value is set to the value of 2.0 mm or less, a cut surface having a 'v'-shaped groove is formed in one of the unit electrodes while a portion spaced apart by at least 1 mm from a vertex of each of the first notching groove 11a and the second notching groove 11b is cut. Particularly, a front end of the 'v'-shaped groove protrudes outward to the outside by 1 mm or more and thus is classified as a defective unit electrode.

Thus, when the set value is set to 2.0 mm or less, one cut surface of the cut unit electrode is formed to a size of 1 mm or less even though the 'v'-shaped groove is formed in the one cut surface of the cut unit electrode. Thus, the cut unit electrode is classified as a normal unit electrode.

Third: When all the first and second notching grooves 11a and 11b are not detected through the first and second line sensors 122*a* and 122*b*, the line sensor 122 determines that a defect occurs in the electrode sheet 10 transferred by the transfer unit 110 to generate the notching groove defect signal and immediately to generate a stop signal to the transfer unit 110 so that the electrode sheet 10 is not transferred.

As described above, the detection unit 120 may use the line sensor 122. Thus, the detection unit 12 may detect the notching groove 11 formed in the electrode sheet 10 and also generate the notching groove detection signal to accurately determine the cutting time of the electrode sheet 10.

The first line sensor 122*a* detecting the first notching groove 11*a* may also detect whether the electrode tab 12 is defective through the variation in transmittance, which occurs when the electrode tab 12 formed on the electrode tab 10 passes. That is, the first line sensor 122*a* may detect a predetermined transmittance when the electrode tab 12 formed on the electrode sheet 10 passes. Here, when a portion or whole of the electrode tab 12 is folded or cut, an irregular variation of the transmittance may occur. Here, the first line sensor 122*a* may detect the irregular variation to determine whether the electrode tab is defective. Therefore, whether the electrode tab is defective may be confirmed without a separate additional detection sensor.

Cutting Unit

The cutting unit 130 may be provided at the cutting point B to cut the electrode sheet 10, in which the notching groove passing through the cutting point B is disposed, according to the notching groove detection signal generated by the detection unit 120. Thus, the unit electrode 1 may be obtained.

That is, when the cutting unit 130 detects the notching groove 11 passing through the measuring point A, the cutting unit 130 cuts the electrode sheet 10 in which the notching groove 11 passing through the cutting point B is disposed.

In the apparatus 100 for cutting the electrode sheet according to the first embodiment of the present invention, which has the above-described configuration, the electrode sheet 10 may be cut through the detection of the notching groove 11 formed in the electrode sheet 10. Thus, the cutting time of the electrode sheet may be accurately detected to accurately cut the electrode sheet, thereby obtain the unit electrodes having the uniform quality.

Method for Cutting Electrode Sheet According to First Embodiment

Hereinafter, a method for cutting an electrode sheet by using the apparatus 100 for cutting the electrode sheet according to the first embodiment of the present invention will be described.

Figure 4:
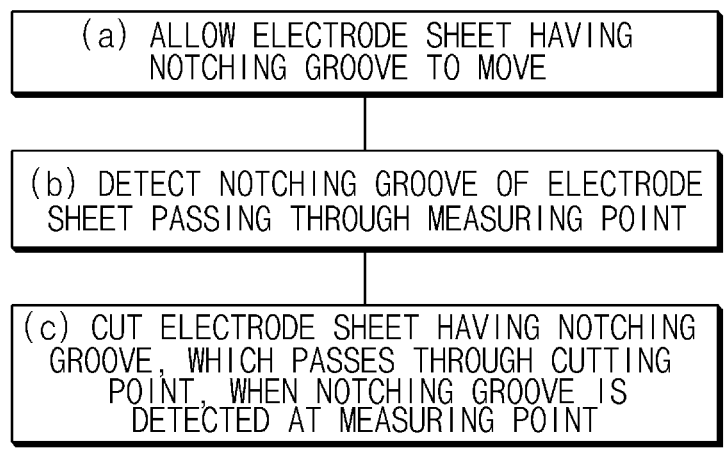
FIG. 4 is a flowchart illustrating a method for cutting an electrode sheet according to the first embodiment of the present invention.

As illustrated in FIG. 4, a method for cutting an electrode sheet according to the first embodiment comprises a step (a) of continuously transferring an electrode sheet 10, in which a plurality of notching grooves 11 are formed in a side surface at regular intervals, up to a cutting point B via a measuring point A, a step (b) of detecting the notching groove 11 of the electrode sheet 10 passing through the measuring point A to generate a notching groove detection signal, and a step (c) of cutting the electrode sheet 10, in which the notching groove 11 passing through the cutting point B is disposed, when the notching groove detection signal is generated, to manufacture a unit electrode 1.

In the step (a), the electrode sheet 10 in which the plurality of notching grooves 11 are formed in the side surface thereof at the regular interval may be continuously transferred up to the cutting point B via the measuring point A by using the transfer unit 110. Here, in the step (a), when a front notching groove 11B disposed at a front end of the notching groove 11 formed in the electrode sheet 10 passes through the cutting point B, the electrode sheet 10 is transferred so that a rear notching groove 11A disposed at a rear end of the front notching groove 11A passes through the measuring point.

In the step (b), the detection unit 120 detects the notching groove 11 of the electrode sheet 10 passing through the measuring point A to generate the notching groove detection signal.

Here, the detection part 120 comprises a line sensor 122, which is installed in a direction perpendicular to the transfer direction of the electrode sheet 10 to detect the notching groove 11 of the electrode sheet 10 passing through the measuring point A, thereby generating a notching groove detection signal. The line sensor 122 comprises a plurality of light receiving elements 122*c*. The plurality of light receiving elements 122*c* detects the notching groove 11 through a variation in transmittance, which occurs when the notching groove 11 of the electrode sheet 10 passes through the measuring point A.

Here, the line sensor 122 comprises first and second line sensors 122*a* and 122*b* detecting the first and second notching grooves 11*a* and 11*b*, which are respectively formed in both side surfaces of the electrode sheet 10, to generate the notching groove detection signal.

For example, the line sensor 122 may generate the notching groove detection signal even though any one of the first and second notching grooves 11*a* and 11*b* is detected through the first and second line sensors 122*a* and 122*b*. That is, even though any one of the first and second notching grooves 11*a* and 11*b* is detected through the first and second line sensors 122*a* and 122*b*, the line sensor 122 may generate the notching groove detection signal by detecting the detected notching groove as the cutting point.

When all the first and second notching grooves 11*a* and 11*b* are detected through the first and second line sensors 122*a* and 122*b*, the line sensor 122 generates the notching groove detection signal as a mean value of a time at which the first notching groove 11*a* is detected and a time at which the second notching groove 11*b* is detected.

When all the first and second notching grooves 11*a* and 11*b* are not detected through the first and second line sensors 122*a* and 122*b*, the line sensor 122 determines that a defect occurs in the electrode sheet 10 transferred by the transfer unit 110 to generate a notching groove defect signal and immediately stop the transfer unit 110 so that the transfer of the electrode sheet 10 is stopped.

The step (b) further comprises a step of detecting whether an electrode tab is defective through the variation in transmittance, which occurs when the electrode tab disposed on one surface of the electrode sheet passes, by using the detection unit.

In the step (c), when the notching groove detection signal is generated, the electrode sheet 10 in which the notching groove 11 passing through the cutting point B is disposed is cut by using the cutting unit 130 to manufacture a unit electrodes 1.

As described above, the unit electrodes 1 having uniform quality may be continuously manufactured through the method for cutting the electrode sheet according to the first embodiment of the present invention.

Hereinafter, in descriptions of another embodiment of the present invention, constituents having the same configuration and function as the abovementioned embodiment have

Apparatus for Cutting Electrode Sheet According to Second Embodiment

Figure 5:
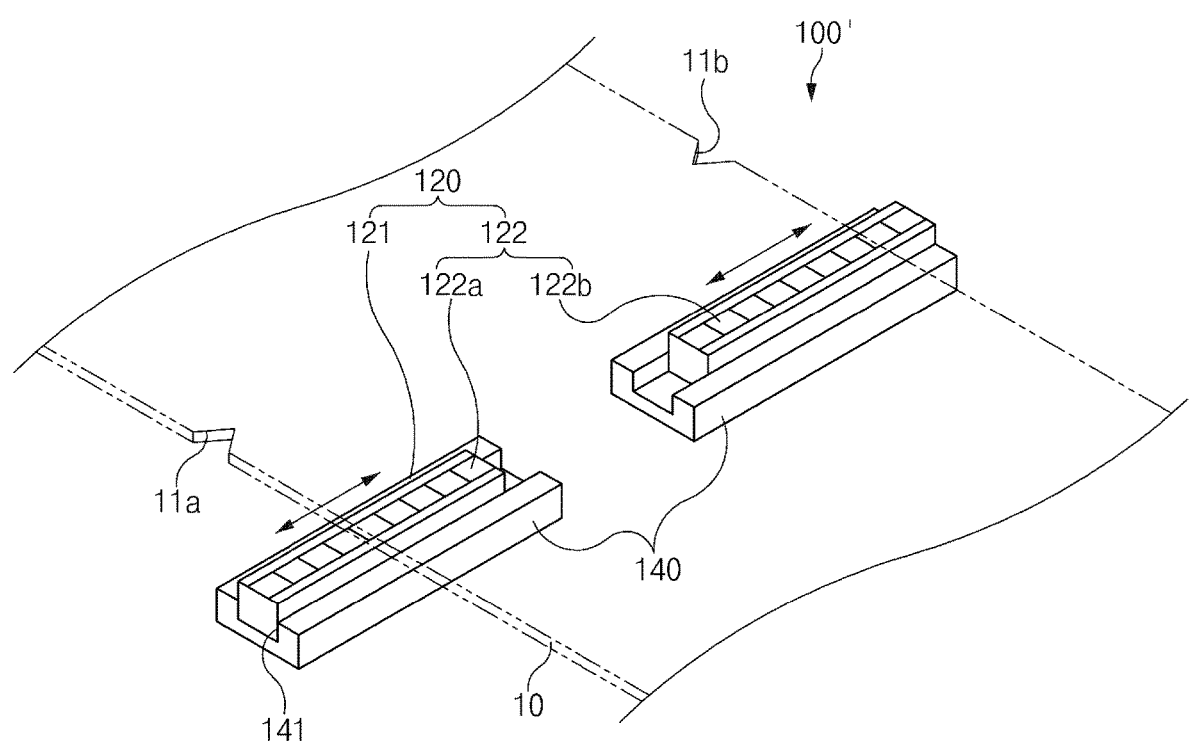
FIG. 5 is a perspective view of an apparatus for cutting an electrode sheet according to a second embodiment of the present invention.

As illustrated in FIG. 5, in an apparatus 100' for cutting an electrode sheet according to a second embodiment of the present invention, the detection unit 120 is installed at the measuring point A. The apparatus 100' for cutting the electrode sheet further comprises an adjusting unit 140 installed to be movable in a direction perpendicular to the transfer direction of the electrode sheet 10.

That is, the adjusting part 140 may allow the detection unit 120 to move in the direction perpendicular to the transfer direction of the electrode sheet 10, and thus, may adjust a position of the detection unit 120 to correspond to the notching groove 11 passing through the measuring point A, thereby more accurately detecting the notching groove 11.

For example, the adjusting unit 140 may be installed at the measuring point A. A guide groove 141 may be formed in a top surface thereof facing the electrode sheet 10 in the direction perpendicular to the transfer direction of the electrode sheet 10. Thus, the detection unit 120 may be movably installed in the guide groove 141 to allow the detection unit 120 to move in the direction perpendicular to the transfer direction of the electrode sheet 10.

As described above, the apparatus 100' for cutting the electrode sheet according to the second embodiment of the present invention may further comprise the adjusting unit 140. Thus, the detection unit 120 may be adjustable according to the position of the notching groove 11 of the electrode sheet so that the electrode sheets having various sizes and shapes are interconvertibly used.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. An apparatus for cutting an electrode sheet, the apparatus comprising:
   a transfer unit transferring the electrode sheet in which a plurality of notching grooves are formed in a side surface thereof up to a cutting point via a measuring point, wherein, when a front notching groove disposed at a front end among the plurality of notching grooves formed in the electrode sheet is passing through the cutting point, a rear notching groove disposed in a rear end of the front notching groove among the plurality of notching grooves is configured to pass through the measuring point;
   a detection unit provided at the measuring point to detect the rear notching groove which passes through the measuring point, thereby generating a notching groove detection signal; and
   a cutting unit provided at the cutting point to cut entirely across the electrode sheet at the front notching groove as the front notching groove is passing through the cutting point, according to the notching groove detection signal generated by the detection unit,
   wherein the detection unit at the measuring point and the cutting unit at the cutting point are separated by a distance between the front notching groove and the rear notching groove of the electrode sheet or by a multiple of the distance between the front notching groove and the rear notching groove of the electrode sheet,
   wherein the cut entirely across the electrode sheet includes the front notching groove,
   wherein the detection unit comprises a line sensor installed in a direction perpendicular to a transfer direction of the electrode sheet to detect the rear notching groove of the electrode sheet passing through the measuring point and thereby to generate the notching groove detection signal,
   wherein each notching groove of the plurality of notching grooves comprises first and second notching rooves respectively formed in both side surfaces of the electrode sheet to face each other,
   wherein the line sensor comprises first and second line sensors to respectively detect the first and second notching grooves, each of the first and second line sensors positioned so that a first portion thereof overlaps the electrode sheet and a second portion thereof does not overlap the electrode sheet in a. plan view.
   wherein each of the first and second line sensors comprises a pluralityof light receiving elements arranged linearly along a length of the line sensor in single file,
   wherein an electrode tab is provided on one surface of the electrode sheet, in which the first notching roove is formed,
   wherein the first line sensor detecting the first notching groove also detects whether the electrode tab is defective through the variation in transmittance of light, which occurs when the electrode tab passes over the first line sensor,
   wherein the line sensor generates the notching groove detection signal when any one of the first and second notching grooves is detected through the first and second line sensors,
   wherein, when both the first and second notching grooves are detected through the first and second line sensors, the line sensor generates the notching groove detection si nal as a mean value of a time at which the first notching groove is detected and a time at which the second notching groove is detected, and
   wherein, when both of the first and second notching grooves are not detected through the first and second line sensors, the line sensor generates a notching groove defect signal.

2. The apparatus of claim 1,
   wherein the plurality of light receiving elements detect the rear notching groove through a variation in transmittance of light, which occurs when the rear notching groove of the electrode sheet passes through the measuring point.

3. The apparatus of claim 2,
   wherein the first and second line sensors are configured to respectively detect the first and second notching grooves.

4. The apparatus of claim 1, wherein the detection unit is installed at the measuring point, and
   wherein the apparatus further comprises an adjusting unit installed to be movable in a direction perpendicular to a transfer direction of the electrode sheet so that the detection unit is adjusted in position to correspond to the rear notching groove passing through the measuring point.

5. The apparatus of claim 4, wherein the adjusting unit adjusts a number of the plurality of light receiving elements that are included in the first portion and the second portion.

6. A method for cutting an electrode sheet, the method compti sing a step (a) of continuously transferring the electrode sheet up to a cutting point via a measuring point by using a transfer unit, the electrode sheet having a plurality of notching grooves formed at a side surface thereof, wherein, when a front notching groove disposed at a front end among the notching grooves formed in the electrode sheet is passing through the cutting point, a rear notching groove disposed in a rear end of the front notching groove among the plurality of notching grooves is configured to pass through the measuring point;
- a step (b) of detecting the rear notching groove passing through the measuring point using a detection unit to generate a notching groove detection signal, and
- a step (c) of cutting entirely across the electrode sheet at the front notching groove as the front notching groove is passing through a cutting point, by using a cutting unit when a notching groove detection signal is generated, to manufacture a unit electrode,
- wherein the detection unit at the measuring point and the cutting unit at the cutting point are separated by a distance between the front notching groove and the rear notching groove of the electrode sheet or by a multiple of the distance between the front notching groove and the rear notching groove of the electrode sheet,
- wherein the cutting entirely across the electrode sheet generates a cut in the electrode sheet that includes the front notching groove,
- wherein the detection unit comprises a line sensor installed in a direction perpendicular to a transfer direction of the electrode sheet to detect the rear notching groove of the electrode sheet passing through the measuring point and thereby to generate the notching groove detection signal,
- wherein each notching groove of the plurality of notching grooves comprises first and second notching grooves respectively formed in both side surfaces of the electrode sheet to face each other,
- wherein the line sensor comprises first and second line sensors to respectivel detect the first and second notching grooves, each of the first and second line sensors positioned so that a first portion thereof overlaps the electrode sheet and a second portion thereof does not overlap the electrode sheet in a plan view,
- wherein each of the first and second line sensors comprises a plurality of light receiving elements arranged linearly along a length of the line sensor in single file,
- wherein an electrode tab is provided on one surface of the electrode sheet, in which the first notching groove is formed,
- wherein the step (B) further comprises a step of detecting whether the electrode tab is defective through a variation in transmittance of light, which occurs when the electrode tab passes over the first line sensor,
- wherein the line sensor generates the notching groove detection signal when any one of the first and second notching grooves is detected through the first and second line sensors.
- wherein, when both the first and second notching grooves are detected through the first and second line sensors, the line sensor generates the notching groove detection signal as a mean value of a time at which the first notching groove is detected and a time at which the second notching roove is detected, and
- wherein, when both of the first and second notching grooves are not detected through the first and second line sensors, the line sensor generates a notching groove defect signal.

7. The method of claim 6, further comprising adjusting a number of the plurality of light receiving elements that are included in the first portion and the second portion.

* * * * *